United States Patent [19]

Schymura

[11] 4,406,464
[45] Sep. 27, 1983

[54] FACE SEAL ARRANGEMENT FOR SEALING A ROTATABLE TUBULAR MEMBER

[75] Inventor: Konrad Schymura, Oberursel, Fed. Rep. of Germany

[73] Assignee: Metallgesellschaft Aktiengesellschaft, Frankfurt am Main, Fed. Rep. of Germany

[21] Appl. No.: 418,333

[22] Filed: Sep. 15, 1982

[30] Foreign Application Priority Data

Jul. 17, 1982 [DE] Fed. Rep. of Germany ....... 3226866

[51] Int. Cl.³ .............................................. F16J 15/38
[52] U.S. Cl. .................................. 277/65; 277/81 R; 277/83; 277/178; 432/115
[58] Field of Search ...................... 277/1, 32, 81 R, 82, 277/65, 83, 93 R, 93 SD, 173, 178; 432/115; 202/222, 223; 308/36.1, 187.1, 187.2

[56] References Cited

U.S. PATENT DOCUMENTS

| | | | |
|---|---|---|---|
| 1,489,857 | 4/1924 | Stevens | 277/65 X |
| 3,724,887 | 4/1973 | Roberts | 432/115 X |
| 3,923,450 | 12/1975 | Inoue et al. | 432/115 |
| 4,071,253 | 1/1978 | Heinen et al. | 277/65 X |

FOREIGN PATENT DOCUMENTS 633231 2/1962 Italy ...................................... 277/65

Primary Examiner—Robert S. Ward, Jr.
Attorney, Agent, or Firm—Sprung, Horn, Kramer & Woods

[57] ABSTRACT

To provide a seal between a rotatable tubular member and a stationary housing, which surrounds the end of the tubular member, a gripping device is non-rotatably secured to the outside peripheral surface of the rotatable tubular member and a sealing element is provided, which is radially movably disposed in the gripping device and rotates with the latter and is in sealing relation to the housing. In order to ensure an effective seal regardless of axial and radial movements of the rotatable tubular member, and to provide a simple structure, which is non-susceptible, the gripping device consists of two spaced apart rings, which are secured to the outside peripheral surface of the rotatable tubular member. Each ring is provided on its inside near its outside diameter with a resilient sealing and restraining element, which protrudes from the surface of the ring. A sealing washer is gripped between the restraining elements and is radially and tangentially displaceable relative to the restraining elements. The circular outer rim of the sealing washer is in sealing relation to and self-centering in the housing and defines only a small clearance therewith.

5 Claims, 2 Drawing Figures

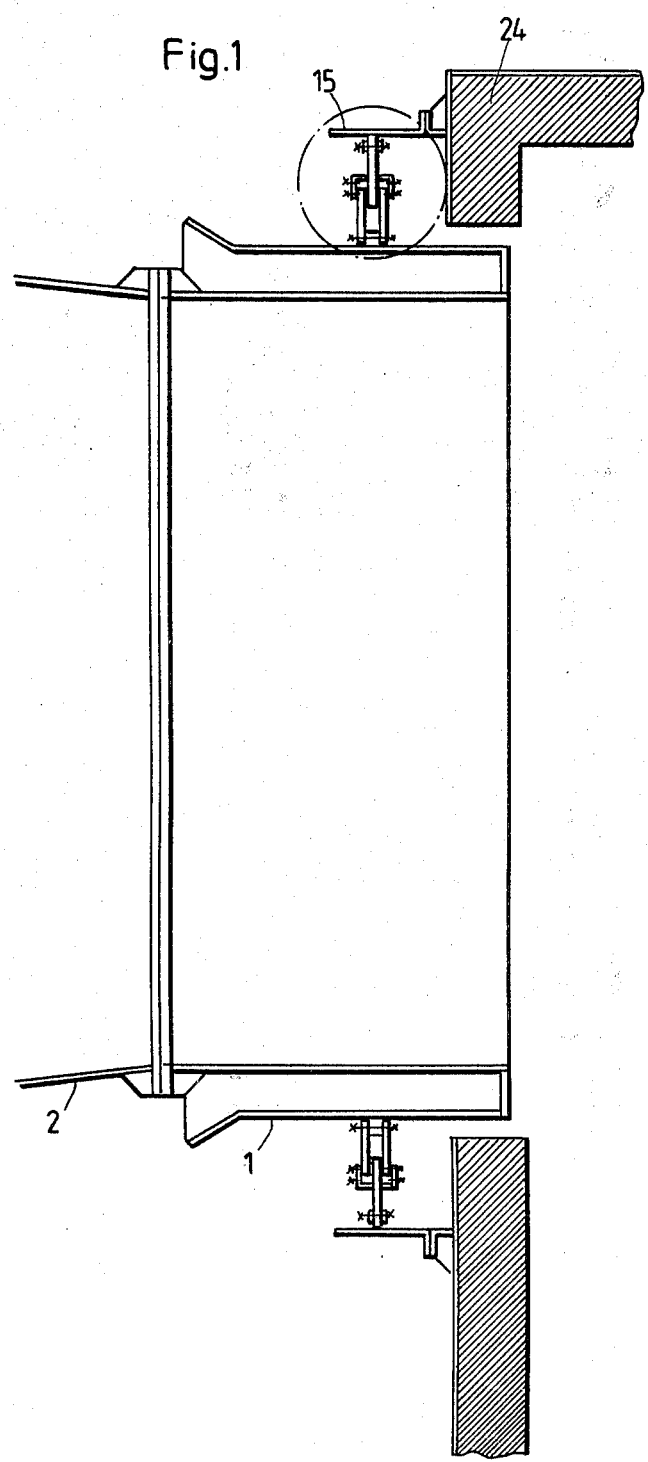

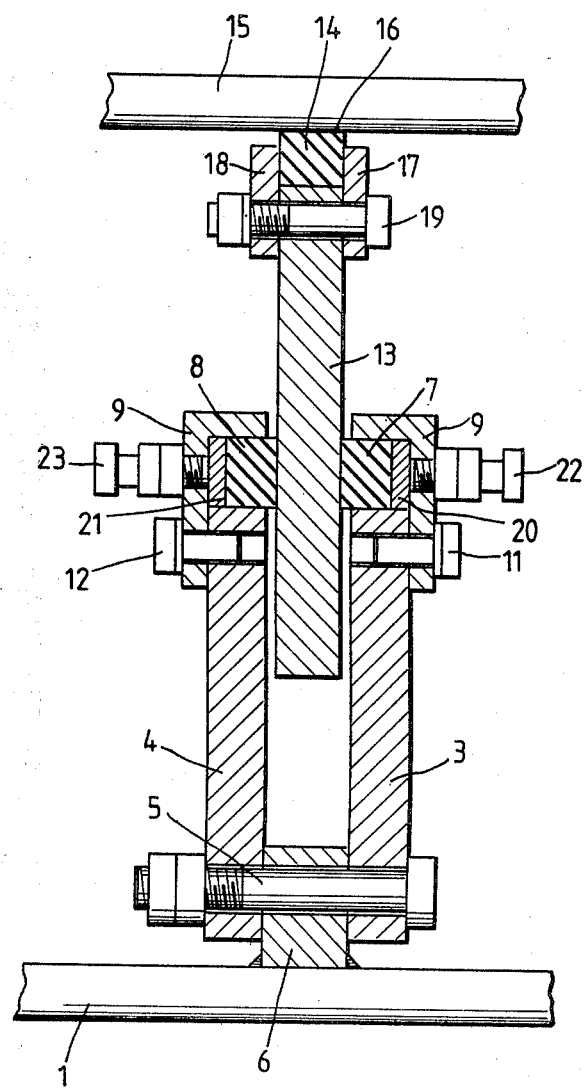

FACE SEAL ARRANGEMENT FOR SEALING A ROTATABLE TUBULAR MEMBER

BACKGROUND OF THE INVENTION

1. Field of the Invention

This invention relates to an apparatus for sealing a rotatable tubular member in a stationary housing which surrounds the end of the tubular member, comprising a gripping device, which is secured to the outside peripheral surface of the rotatable tubular member and rotates with the tubular member, and a sealing element, which is radially movably disposed in the gripping device and rotates with the latter and is in sealing relation to the housing.

2. Discussion of Prior Art

Rotatable tubular members, particularly in rotary kilns, must be sealed at their charging and/or discharge ends in order to prevent or minimize an escape of gases and dusts and an ingress of air. For this purpose the gap between the rotatable tubular member and the stationary housing, which surrounds the end of the tubular member, must be sealed. As a sliding sealing element is required to seal the gap and in most cases is exposed to elevated temperatures, dust and gases, the sliding sealing element is subjected to heavy wear. Additionally, the rotatable tubular member is axially displaced as a result of thermal expansion and owing to the nature of its bearings and also performs continual radial movements because the axis of the rotatable tubular member never coincides exactly with the center line of the housing but performs a gyratory motion about the center line of the housing. Particularly these continual radial movements of the rotatable tubular member impose high stresses on the sliding sealing elements.

The periodical "Zement—Kalk—Gips" No. 5, 1971, contains on pages 208 to 215 a summary of arrangements for sealing rotary kilns. Whereas some of the sealing arrangements disclosed there are structurally expensive, none of them can prevent a heavy wear particularly as a result of the axial movement of rotary kilns.

German Pat. No. 17 50 881 discloses a sealing arrangement comprising a tubular section which surrounds the outside peripheral surface of the rotatable tubular member and has on the inside an annular flange, which overlaps a ring that is secured to the outside peripheral surface of the rotatable tubular member. On the other side the flange is forced against the ring by thrust members, which are connected to the ring by screws. The flange and the tubular section are radially displaceable and are connected to the rotatable tubular member by chains so that the flange and the tubular section rotate with the rotatable tubular member. A sealing ring composed of a plurality of segments is secured to the stationary housing and surrounds and supports the tubular section. Owing to the asymmetrical loading of the tubular section, the gyratory motion of the end of the tubular member and the frictional contact between the flange of the tubular section and the gripping device, the radial displacement results in an additional load. The sealing segments always subjected to contact pressure wear heavily, the pressure contact of the sealing segments and the gripping device are highly liable to be deranged, and the sealing arrangement is highly expensive and can be mounted only with difficulty.

SUMMARY OF THE INVENTION

It is an object of the invention to avoid the disadvantages of the known sealing arrangements and to provide a sealing arrangement which maintains a satisfactory seal regardless of axial and radial movements of the rotatable tubular member and which is simple in structure, can easily be mounted, and is only slightly susceptible to mechanical stresses and chemical attacks.

This object is accomplished according to the invention in that the gripping device comprising at least two spaced apart rings, which are secured to the outside peripheral surface of the rotatable tubular member, a resilient sealing and restraining element is secured to the inside of each ring near the outside diameter of the latter and protrudes beyond the surface of the ring, a sealing washer is gripped between the restraining elements and is radially and tangentially displaceable relative to the restraining elements, and the circular outer rim of the sealing washer is in sealing relation to and self-centering in the housing and defines only a small clearance therewith.

The rings may be secured directly to the outside peripheral surface of the rotatable tubular member or may be secured to holders, which are secured to said outside peripheral surface. The resilient restraining elements protrude somewhat from the inside surface of the rings so that there is a clearance between the sealing washer and the rings. The contact pressure between the restraining elements and the sealing washer is so adjusted that the sealing washer is supported by the restraining elements but can be radially and tangentially displaced under pressure applied to its circular outer rim.

During the tangential displacement, the sealing washer no longer rotates with the rotatable tubular member or rotates at a lower speed than said member. The sealing washer centers itself in the housing and defines only a very small clearance with the housing and is not displaced unless the motion of the rotatable tubular member is changed. The sealing washer can be made of steel. The rings can also be made of steel and may be composed of a plurality of segments.

According to a preferred feature, a resilient ring is secured to the circular outer rim of the sealing washer. As a result, the clearance can be minimized and the conditions of a sliding seal are approached. The resilient ring is preferably held on its sides by sheet metal elements, which are screw-connected to the side faces of the sealing washer and protrude from its circular outer rim.

According to a preferred feature, the two rings of the gripping device are secured by screw means to a lower flange, which is disposed between the rings and is secured to the outside peripheral surface of the rotatable tubular member. By such an arrangement, a transmission of thermally induced stresses to the rings is substantially avoided.

According to a preferred feature, the resilient restraining elements are disposed on the circular outer rim of the rings and are held by angle-section rings, which are screw-connected to the rings. This arrangement facilitates a replacement and involves manufacturing costs.

According to a preferred feature, the gripping action exerted by the restraining elements on the sealing washer can be adjusted by thrust rings and adjusting screws. This arrangement permits a simple and effective adjustment of the contact pressure.

BRIEF DESCRIPTION OF THE DRAWINGS

The invention will be explained in detail and by way of example with reference to the drawings.

FIG. 1 is a longitudinal sectional view showing the discharge end of a rotary kiln.

FIG. 2 is an enlarged view showing the portion which is surrounded by a circle in FIG. 1.

DESCRIPTION OF SPECIFIC EMBODIMENT

Referring to FIG. 2, two spaced apart rings 3, 4 are secured to screws 5 to a lower flange 6, which is welded to the jacket 1 of the tube 2 (FIG. 1) of a rotary kiln. Resilient sealing and restraining elements 7,8 are mounted on the outside diameter of the rings 3,4 and protrude from the inside surface of the rings 3,4. The restraining elements 7,8 are held by angle-section rings 9,10, which are connected to the rings 3,4 by screws 11,12.

A sealing washer 13 is gripped between the restraining elements 7,8 and defines clearance with the inside surfaces of the rings 3,4. A resilient ring 14 is secured to the circular outer rim of the sealing washer 13 and defines only a small clearance 16 with the ring 15 of the housing 24. The resilient ring 14 is held by sheet metal elements 17,18 which are secured to the sealing washer 13 by screws 19. The gripping action exerted by the resilient restraining elements 7,8 is adjustable by means of thrust rings 20,21 and adjusting screws 22, 23.

The advantages afforded by the invention reside in that a sealing arrangement is provided which consists of simple elements and is self-centering and perfectly compensates radial tumbling motions of the rotatable tubular member as though the axis of the rotating tubular member coincided with the center line of the housing. The sealing washer defines only a very small clearance with the housing and is subjected only to a very small wear. As the sealing washer will not be displaced unless the motion of the rotatable tubular member is changed, the wear of the restraining elements for the sealing washer is small, also.

What is claimed is:

1. An apparatus for sealing a rotatable tubular member in a stationary housing, which surrounds the end of the tubular member, comprising a gripping device, which is secured to the outside peripheral surface of the rotatable tubular member and rotates with the tubular member, and a sealing element, which is radially movably disposed in the gripping device and rotates with the latter and is in sealing relation to the housing, said gripping device comprising at least two spaced apart rings, which are secured to the outside peripheral surface of the rotatable tubular member, a resilient sealing and restraining element secured to the inside of each ring near the outside diameter of the latter, each of which protrudes beyond the surface of its respective ring, a sealing washer disposed between said resilient sealing and restraining elements and gripped thereby, said sealing washer being radially and tangentially displaceable relative to said restraining elements, said sealing washer having a circular outer rim in sealing relation to and self-centering in said housing and defining only a small clearance therebetween.

2. An apparatus according to claim 1, wherein a resilient ring is secured to the circular outer rim of the sealing washer.

3. An arrangement according to claim 1 or 2, wherein the two rings of the gripping device are connected by screw means to a lower flange, which is disposed between said rings and is secured to the outside peripheral surface of the rotatable tubular member.

4. An apparatus according to claim 1 wherein the resilient restraining elements are mounted on the circular outer rims of said rings and are held by angle-section rings, which are screw-connected to said rings.

5. An apparatus according to claim 1, wherein the gripping action exerted by the restraining elements on the sealing washer can be adjusted by thrust rings and adjusting screws.

* * * * *